(12) United States Patent
Beaulieu

(10) Patent No.: US 9,837,880 B2
(45) Date of Patent: Dec. 5, 2017

(54) MAGNETOSTATIC VOLTAGE/CURRENT LIMITING SYSTEM FOR TURBINE GENERATOR COMPRISING THE SAME

(71) Applicant: André Beaulieu, St-Marc sur Richelieu (CA)

(72) Inventor: André Beaulieu, St-Marc sur Richelieu (CA)

(73) Assignee: Andre Beaulieu, St-Marc sur Richelieu (CA)

( * ) Notice: Subject to any disclaimer, the term of this patent is extended or adjusted under 35 U.S.C. 154(b) by 525 days.

(21) Appl. No.: 14/537,086

(22) Filed: Nov. 19, 2014

(65) Prior Publication Data

US 2015/0130331 A1 May 14, 2015
US 2016/0164379 A9 Jun. 9, 2016

Related U.S. Application Data

(60) Provisional application No. 61/902,365, filed on Nov. 11, 2013.

(30) Foreign Application Priority Data

Nov. 10, 2014 (CA) ...................................... 2871227

(51) Int. Cl.
*H02K 21/00* (2006.01)
*H02K 11/26* (2016.01)
*H02K 11/27* (2016.01)

(52) U.S. Cl.
CPC ............. *H02K 11/26* (2016.01); *H02K 11/27* (2016.01); *Y02E 10/725* (2013.01)

(58) Field of Classification Search
CPC ........ H02K 21/00; H02K 21/12; H02K 11/26; H02K 11/27
See application file for complete search history.

(56) References Cited

U.S. PATENT DOCUMENTS

| 3,264,504 | A | * | 8/1966 | Lamorlette | ............... | H02J 7/26 |
| | | | | | | 310/168 |
| 3,270,268 | A | * | 8/1966 | Carmichael | ............ | H02K 21/00 |
| | | | | | | 320/123 |
| 3,599,024 | A | * | 8/1971 | Kitamura | ............... | H02K 19/24 |
| | | | | | | 310/163 |
| RE27,704 | E | * | 7/1973 | Carmichael | ............. | F02P 1/086 |
| | | | | | | 123/599 |

(Continued)

*Primary Examiner* — Dang Le
(74) *Attorney, Agent, or Firm* — Robert Brouillette; Brouillette Legal Inc.

(57) ABSTRACT

A magnetic voltage/current limiting system is mounted in conjunction with a main coil, in a coil assembly of a wind turbine generator, for limiting the outputted voltage (or current) to a predetermined upper value. The limiting system generally has at least one limiting coil and a control circuit connected to the main coil. The limiting system is configured to be activated when the voltage (or current) outputted by the main coil increases beyond the predetermined upper value. Once activated, the limiting system diverts a portion of the outputted current to the limiting coil such as to generate a magnetic field in the limiting coil. This additional magnetic field generally limits the amount magnetic field generated by passing magnets to flow through the main coil, thereby limiting the outputted voltage.

13 Claims, 8 Drawing Sheets

(56) References Cited

U.S. PATENT DOCUMENTS 4,641,080 A * 2/1987 Glennon .............. H02K 21/025
  310/152
6,541,887 B2 * 4/2003 Kawamura .............. B60K 6/26
  310/181

* cited by examiner

MAGNETOSTATIC VOLTAGE/CURRENT LIMITING SYSTEM FOR TURBINE GENERATOR COMPRISING THE SAME

CROSS-REFERENCE TO RELATED APPLICATIONS

The present patent application claims the benefits of priority of U.S. Provisional Patent Application No. 61/902,365, entitled "Magnetostatic Voltage/Current Limiting System for Wind Turbine Generator and Generator Comprising the Same", and filed at the United States Patent and Trademark Office on Nov. 11, 2013, the content of which is incorporated herein by reference.

FIELD OF THE INVENTION

The present invention generally relates to generators used with wind turbines for generating electric power from wind power, and more particularly to control circuits and systems for controlling the voltage and/or current generated by the generator. The present invention further relates to control circuits and systems for limiting the rotation speed of generators.

BACKGROUND OF THE INVENTION

Wind power is increasingly harvested as a source of renewable power. Typically, wind power is converted into electricity by rotating blades which, in turn, rotate a rotor in an electric generator.

The way most wind turbines are configured, the faster the blades turn, the more voltage and/or current is generated. Understandably, since wind speeds are notably unreliable, most wind turbine generators are either overdimensioned to be able to manage rare occurrences of very high wind, or provided with complex mechanical systems to brake or slow down the blades and rotor in high wind conditions.

Understandably, both the overdimensioning and the provisioning of complex mechanical braking systems add significant costs to wind turbines.

Hence, in view of the above, there is a need for a system which would at least mitigate the shortcoming of prior art wind turbine generators.

SUMMARY OF THE INVENTION

A magnetic voltage/current limiting system in accordance with the principles of the present invention generally mitigates at least some shortcoming of prior art wind turbine generators by providing a simple mechanism to limit the voltage or current outputted by the wind turbine generator to a predetermined threshold value.

A wind turbine electric generator generally comprises a rotor mechanically coupled (directly or through a transmission) to the blades of the wind turbine, and a stator located around the rotor. As the wind brings the blades of in movement, the rotor also turns to generate electric energy.

Typically, the rotor supports an even number of permanent magnets adjacently disposed about the periphery of the rotor. For its part, the stator typically supports an even or odd number of magnetic coil assemblies. The coil assemblies are typically disposed such as to face the magnets during rotation of the rotor. As is commonly known, rotation of the rotor causes variation in the magnetic field passing through the core and coil of the coil assemblies. In turn, this magnetic field variation generates voltage and current at the outputs of the coils.

In accordance with the principles of the present invention, the magnetic voltage/current limiting system typically comprises two limiting coils mounted to the metallic core of the coil assembly, substantially coaxially with the main coil, and a control circuit connecting the limiting coils to the output of the main coil.

The limiting coils comprise a radially inner limiting coil located closer to the rotor than the main coil, and a radially outer limiting coil located farther from the rotor than the main coil. The limiting coils are mounted such as to generate opposite magnetic fields. Others arrangements or configurations are also possible for different applications.

The control circuit is configured to allow the passage of current though the limiting coils only when the voltage (or current) outputted by the main coil becomes greater than a predetermined value. Understandably, as the output voltage of the mail coil is generally proportional to the speed of the rotor in revolutions per minute (RPM), itself proportional to the speed of the wind, the control circuit will only be activated when the speed of the wind is too high (or higher than a predetermined speed).

In use, when the control circuit activates, the control circuit will allow a portion of the current generated by the main coil to be diverted to the limiting coils circuit.

Due to the configurations (e.g. winding direction) of the limiting coils, both limiting coils will generate opposite magnetic fields, magnetic fields which will also flow through the main coil.

The additional magnetic fields going through the main coil will generally limit the amount of magnetic field generated by the passing magnets that will be able to flow through main coil. Understandably, if less magnetic field flows through the main coil, the main coil will generate less voltage and current.

When the voltage outputted by the main coil falls back below the predetermined value, the control circuit deactivates and no current is diverted to the limiting coils circuit.

In typical yet non-limitative embodiments, the control circuit comprises a Zener diode to control the predetermined voltage at which the control circuit will activate, and a resistor for limiting the amount of current flowing in the limiting coils. In some embodiments, the natural resistance of the limiting coils could be sufficient to limit the amount of current flowing in the limiting coils. In such embodiment, no additional resistor would be necessary.

Understandably, a magnetic voltage/current limiting system in accordance with the principles of the present invention will generally brake and slow down the rotor accordingly to the current/voltage fed in the limiting coils. In addition, the magnetic voltage/current limiting system will limit the amount of voltage or current that can be outputted by the main coils to downstream equipment, thereby avoiding the need for overdimensioning the electric circuitry and equipment downstream responsible for managing the voltage and current generated by the coils of the stator in order to handle voltage spikes for instance.

Furthermore, a magnetic voltage/current limiting system in accordance with the principles of the present invention is relatively inexpensive to manufacture as all the main components are widely available and cheap.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel magnetic voltage/current limiting system for a wind turbine generator will be described hereinafter as a novel generator featuring the present voltage/current limiting system. Although the invention is described in terms of specific illustrative embodiments, it is to be understood that the embodiments described herein are by way of example only and that the scope of the invention is not intended to be limited thereby.

Figure 1:
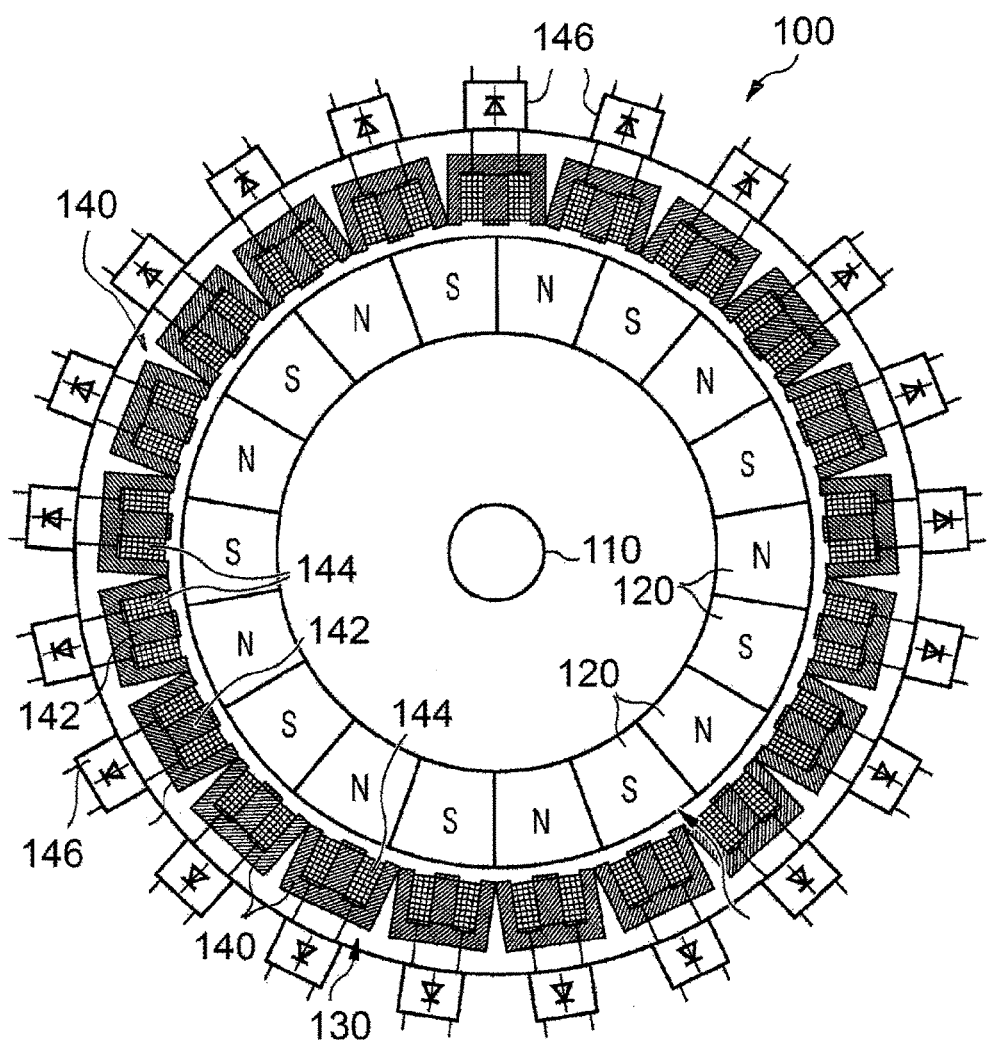
FIG. 1 is a schematic axial view of an exemplary wind turbine generator in accordance with the principles of the invention.

Referring first to FIG. 1, a prior art wind turbine generator is generally shown at 100. The generator 100 comprises a ring-shaped rotor 110 (also called rotor assembly) mounted for rotation around an axis of rotation within a coaxial ring-shaped stator 130 (also called stator assembly).

The rotor 110, which is directly or indirectly (e.g. through a transmission) coupled to the wind turbine (or a rotating assembly, not shown) comprises an even number of permanent magnets 120. As shown in FIG. 1, the magnets are mounted at the periphery of the rotor 110 and such that adjacent magnets 120 have opposed polarity.

For its part, the stator 130 comprises a plurality of coil assemblies 140. Notably, contrary to the magnets 120, the number of coil assemblies 140 does not have to be either even or odd. Still, various arrangements of magnets and coil assemblies exist to reduce undesirable phenomena, for instance, cogging.

As best shown in FIG. 1, the coil assemblies 140 are disposed about the inner periphery of the stator 130 and such as to face the magnets 120.

The coil assemblies 140 each comprise a metallic core 142 made of ferro-magnetic or similar material (also called magnetically transmissive core component), the core 142 being surrounded by a main coil 144 (also called a generating coil) and a set of limiting coils 162, 164.

In the generator shown in FIG. 1, each coil assembly 140 comprises its own voltage rectifying circuit 146 such as to output rectified voltage.

Alternatively, in the generator, each coil assembly 140 may comprise a generating coil 144 and a voltage rectifying circuit 146. However, on contrary to the embodiment described in FIG. 1, the current feeding the limiting coils 162 and 164 is not generated by the generating coil 144 located on the same metallic core 142, but rather according to a slightly de-phased process, is fed by a generating coil 144 disposed about a neighbor metallic core 142.

Even though embodiments wherein generating coils 144 and limiting coils 162 and 164 are either co-existing or neighbor with respect to metallic cores 142, other configurations are available providing different efficiency levels.

Figure 2:
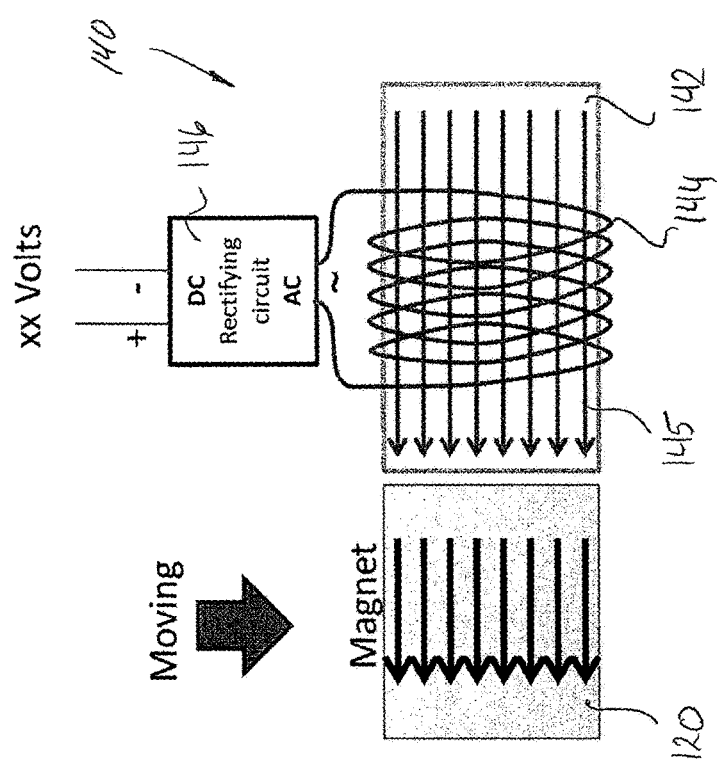
FIG. 2 is a schematic view of one magnet and one coil assembly of the generator of FIG. 1.

Referring now to FIG. 2, in an assembly with no limiting coils, when a magnet 120 passes in front of a coil assembly 140, the variation in the magnetic field 145 flowing through (or induced in) the core 142 induces a current in the wire, or wires, of the main coil 144.

As in known in the art, the faster the rotor 110 turns, the faster the magnets 120 pass in front of the coil assemblies 140. In turn, the faster the magnets 120 pass in front of the coil assemblies 140, the higher the current induced in the main coil, thus the voltage generated and outputted by the main coils 144.

Understandably, in most wind conditions, this is not a problem. However, in high wind conditions, it is possible that the rotor 110 turns fast enough such that the voltage outputted by the coils 144 surpasses the highest voltage the downstream electric circuitry and equipment is designed for. Further risks of mechanical breakdown may also result from these high wind conditions.

Figure 3:
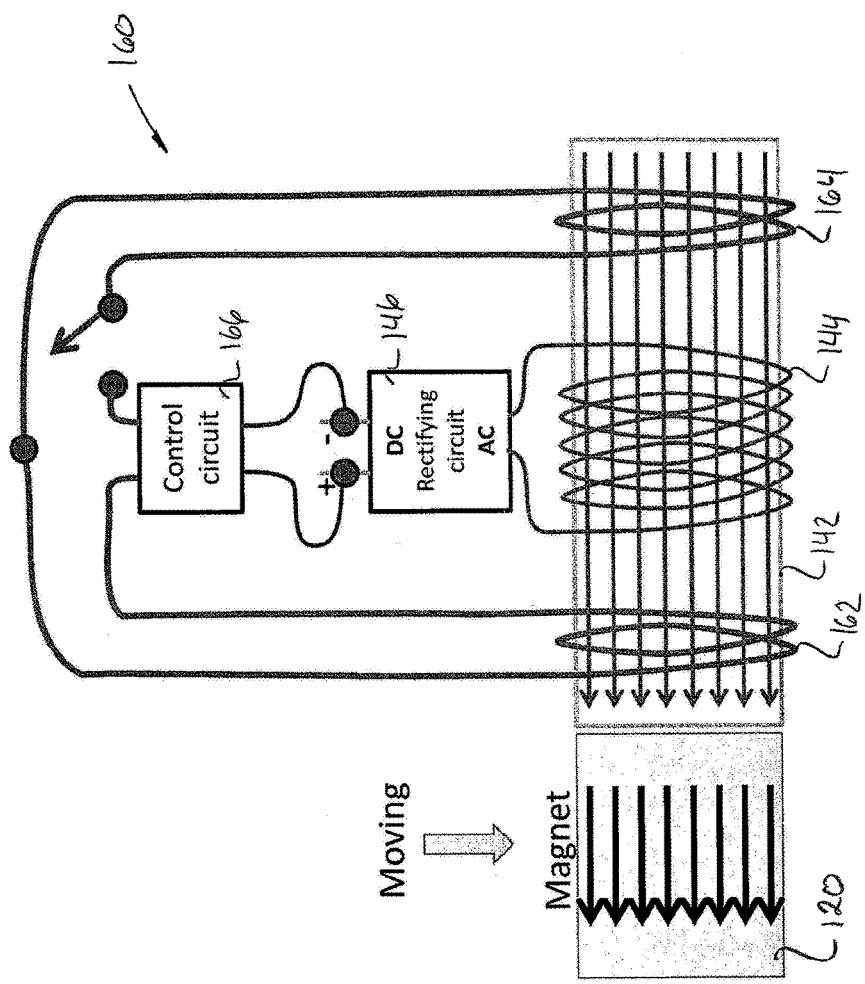
FIG. 3 is a schematic view of one magnet and one coil assembly, the coil assembly comprising an embodiment of the magnetic voltage limiting system in accordance with the principles of the present invention.

Referring now to FIG. 3, a coil assembly 140 featuring an embodiment of a magnetic voltage/current limiting system 160 (also called a field limiting system) is shown.

In the present embodiment, the limiting system 160 comprises two field limiting coils 162 and 164 wound about the core 142, and a control circuit 166 which is connected to the output of the main coil 144, and more particularly to the output of the rectifying circuit 146.

The control circuit 166 (also called field limiting control component) is configured to allow the flow of current in the limiting coils 162 and 164 only when the voltage at the output of the main coil 144 is over a predetermined upper voltage threshold. The threshold is generally determined by the highest level of voltage that the downstream electrical circuitry and equipment are designed to handle. For instance, if the downstream equipment is able to handle up to 400 V, than the control circuit 166 should activate when the voltage at the output of the main coil 144 reaches at most 400 V. Typically though, the threshold voltage should be lower than the upper voltage capacity of the downstream equipment such as to have a margin of safety.

In an alternative embodiment, the current is measure to determine when to divert a portion of the current.

The control circuit 166 is further connected to the limiting coils 162 and 164.

As best shown in FIG. 3, in the present embodiment, in a radial direction of the generator 100, limiting coil 162 is located radially inwardly with respect to the main coil 144, whereas limiting coil 164 is located radially outwardly with respect to the main coil 144.

Furthermore, the winding configuration of limiting coils 162 and 164 is such that coils 162 and 164 generate magnetic fields in opposed directions when current flows in them. This way, heat is only generated in the limiting coils when induced current oversteps the threshold limit and helps distribute the heat. At mid-point of the coil, the current is zero but, to generate magnetic field, current will flow through both limiting coils 162 and 164 (more like a capacitor), thus generating some heat. The amount of heat will be small because the current travelling in the limiting coil is only the surplus diverted from the main coil generated current. The main coil 144 will be receiving a maximum amount of energy and the surplus heat will be distributed in the limiting coils 162 and 164 and the resistor 170. By connecting the limiting coils 162 and 164 in opposition, it will limit the heat generated due to ohmic resistance of the copper wire to what is needed to generate the magnetic field only. Also the limiting resistor 170 (if needed) will dissipate some of that heat. Some heat but not much will be generated in the limiting coils 162 and 164.

In the present embodiment, the control circuit 166 comprises a Zener diode 168 to allow the passage of current only when the predetermined voltage is reached, and a resistor 170 to limit the flow of current, if needed.

Even though FIG. 3 illustrates a circuit wherein the limiting coils 162 and 164 are fed through direct current (DC), alternative embodiment may involve removing the rectifying circuit 146 from between the control circuit 166 and the generating coil 144. Accordingly, the limiting coils 162 and 164 are fed with alternative current. Even with alternative current, the system remains functional.

Figure 4A:
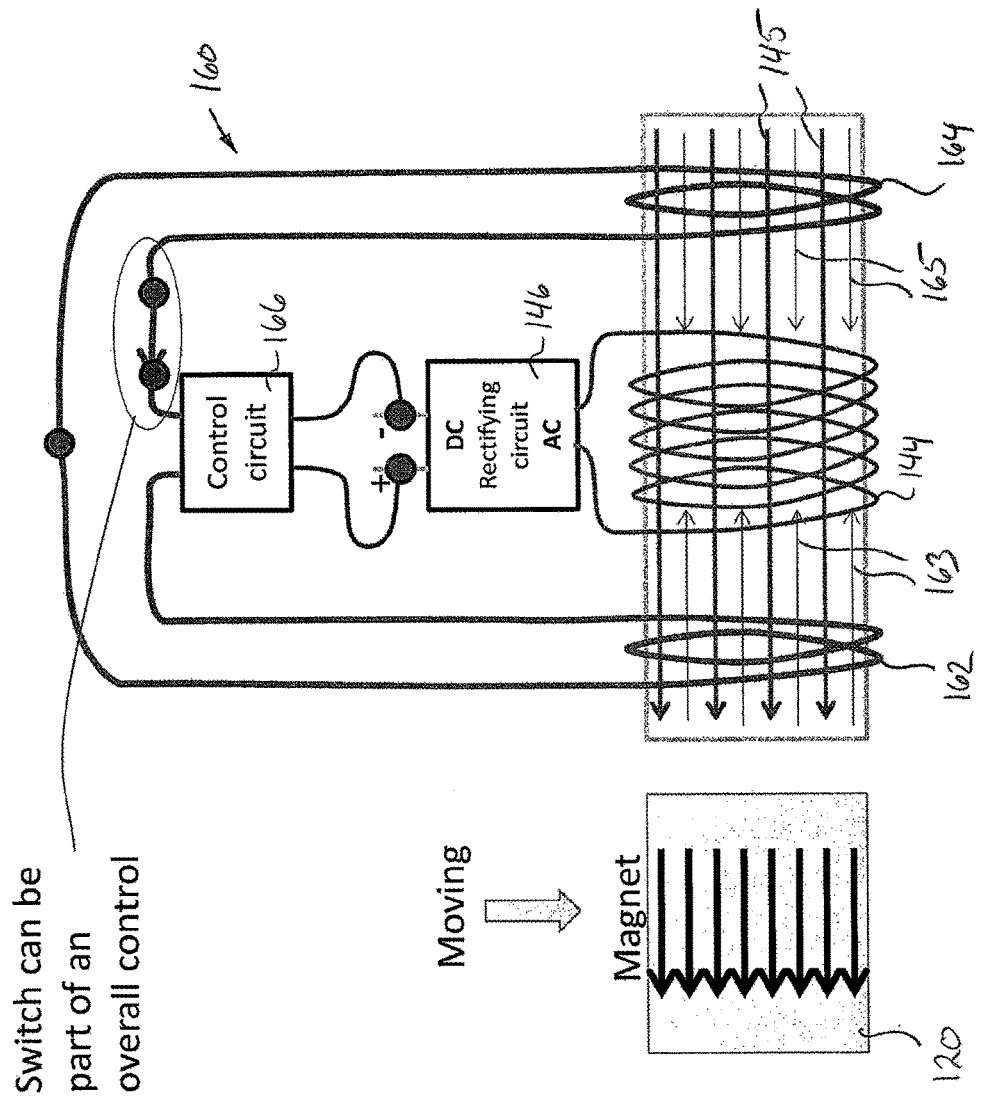
FIGS. 4A and 4B are schematic views the magnet and coil assembly of FIG. 3, with the magnetic voltage limiting system in operation.
Figure 4B:
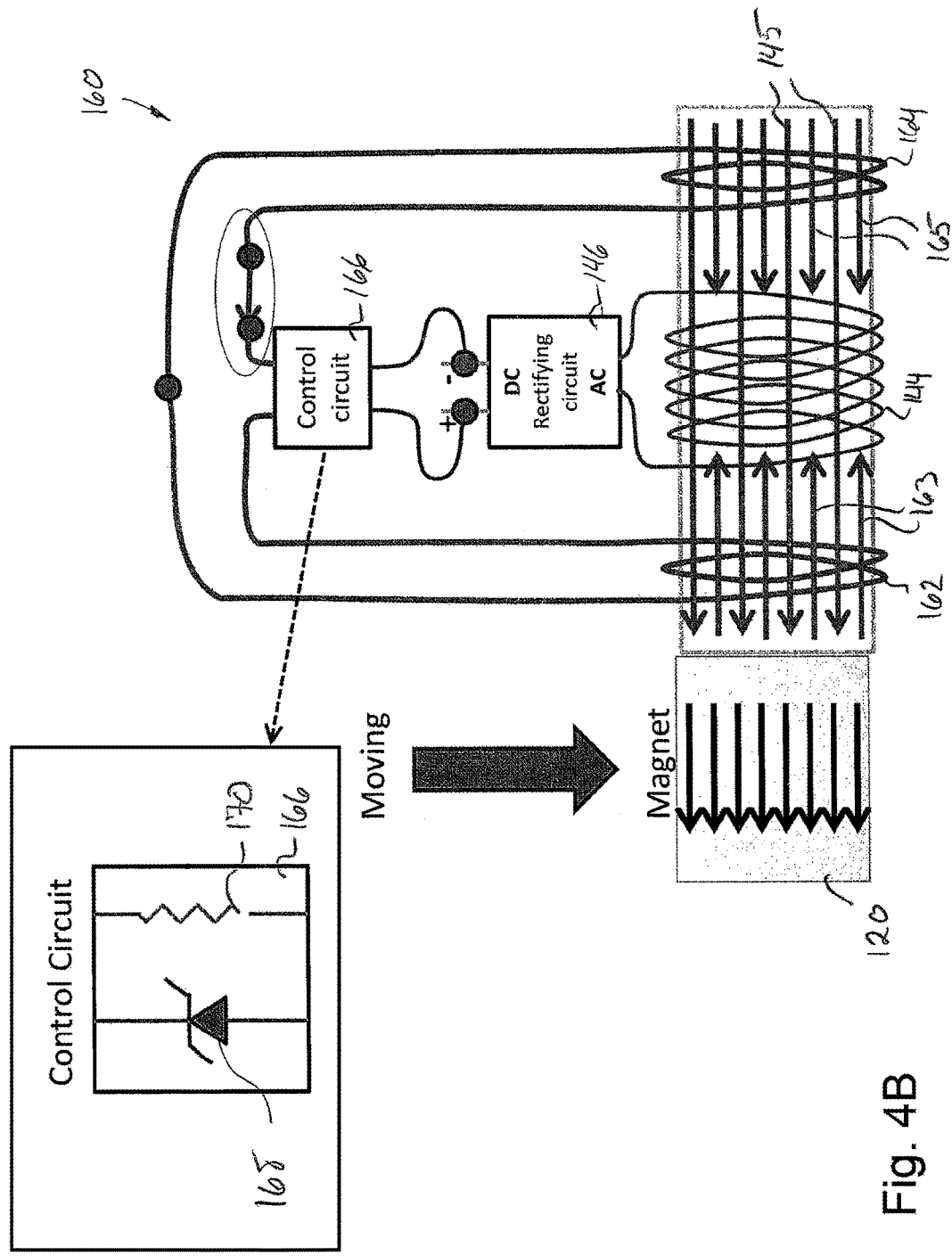

In that sense, referring now to FIGS. 4A and 4B, when the rotor 110 reaches a certain number of RPMs, the magnets 120 pass in front of the coil assemblies 140 with enough speed to cause the main coils 144 to output a voltage reaching the predetermined threshold value. At such point, the control circuit 166 activates and starts diverting the over-threshold portion of the current outputted by the main coil 144 toward the limiting coils 162 and 164.

In FIGS. 4A and 4B, the limiting coils 162 and 164 are shown to generate limiting magnetic fields 163 and 165 of opposed directions. As these two opposed magnetic fields flow through the main coil 144, they decrease the current induced effect of the passage of the magnetic field 145 generated by the passing magnets 120 through a saturation effect of the stator core 142 by the limiting magnetic fields 163 and 165.

If less magnetic field 145 generated by the passing magnets 120 passes through the main coil 144, then the main coil 144 will output less voltage. This has an auto-regulating effect of decreasing the induced current, which results in a decrease of the limiting opposed magnetic fields as the induced current decreases.

Ultimately, when the rotor slows down, the voltage outputted by the main coil 144 falls below the threshold value (when the wind speed decreases), the control circuit 166 ultimately deactivates and stops diverting current outputted by the main coil 144 to the limiting coils 162 and 164 which consequently stop generating magnetic fields 163 and 165.

Still in reference to FIGS. 1 to 4, the circuit may further comprises a temperature gauge (not illustrated) located on at least one of the metallic core 142, the generating coil 144 or the limiting coils 162 and 164 one at least one of the metallic core/coils assembly. Having the temperature gauge electrically connected to the control circuit 166, the system is able to detect increases of temperature over a limit, and to command accordingly the control circuit 166 to feed current to the limiting coils 162 and 164 in these situations to allow the system to gradually cool down by a combination of slowing down and generating less power.

Still in reference to FIGS. 1 to 4, the circuit may further comprises a short-circuit detection component (not illustrated) connected to the control circuit to automatically divert at least part of the current to the limiting coils 162 and 164 in this situation to slow down the wind turbine and prevent further damages that may potentially result from that short-circuit.

Figure 5:
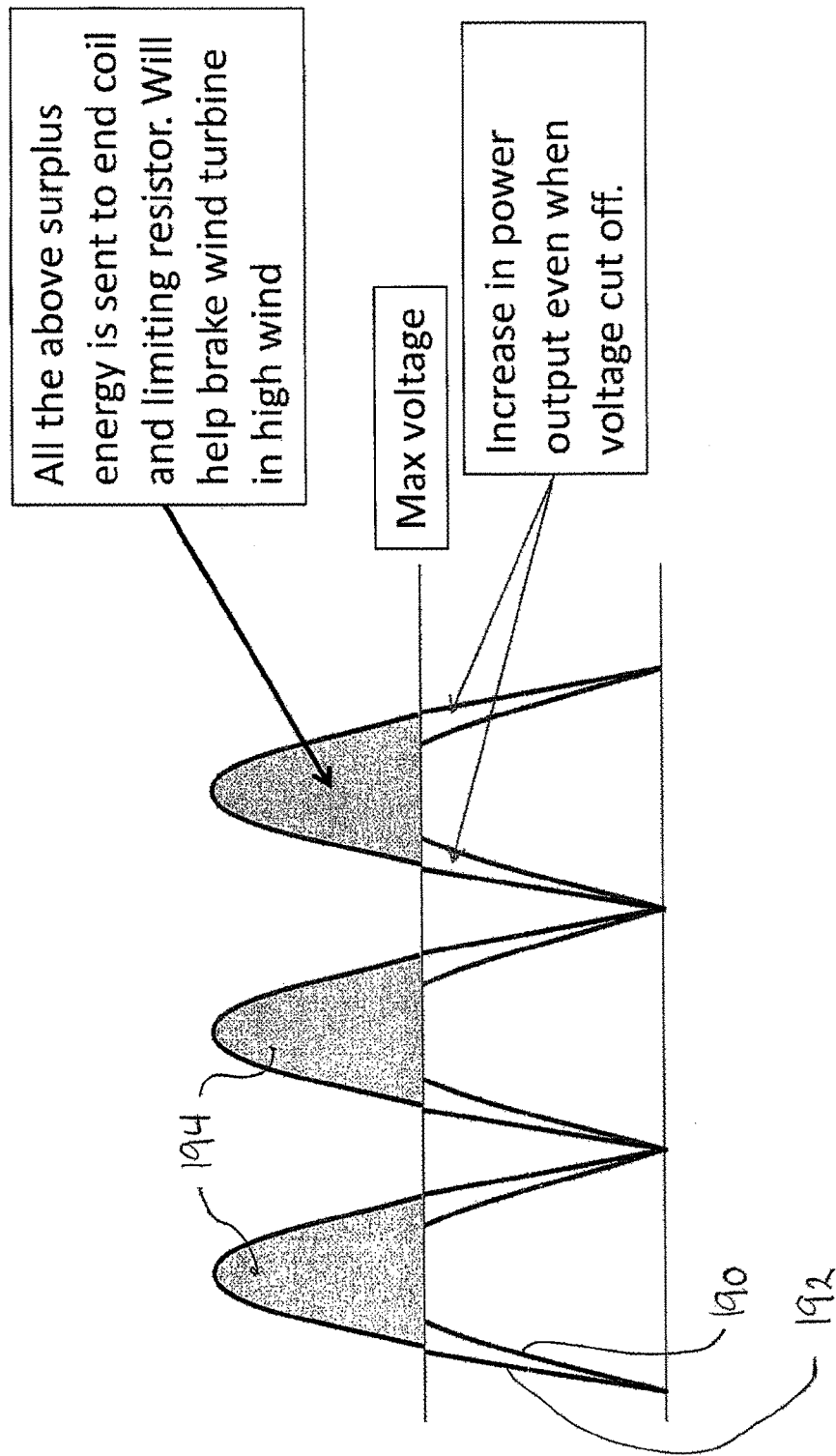
FIG. 5 is a graph of the voltage waveform outputted by the coil assembly.

Referring now to FIG. 5, the waveforms of the voltage outputted by the main coil 144 are shown. Notably, as shown in FIG. 5, the waveform of the outputted voltage widens from 190 to 192 as the speed of the rotor rises. This widening of the waveform allows the generator to output more power even if the voltage is cut off beyond the predetermined threshold by the limiting system 160. Understandably, the portion of the voltage 194 that is cut off (in other words diverted from a current generating circuit to the limiting circuit, is sent to the limiting coils 162 and 164 and to the resistor 170 to assist in slowing down and braking the wind turbine and rotor 110 in high wind conditions. Accordingly, an auto-regulated mode takes places during which the system both produces current and uses the current over the threshold value to regulate both the speed of the wind turbine (which involves decreasing the generated current).

Figure 6A:
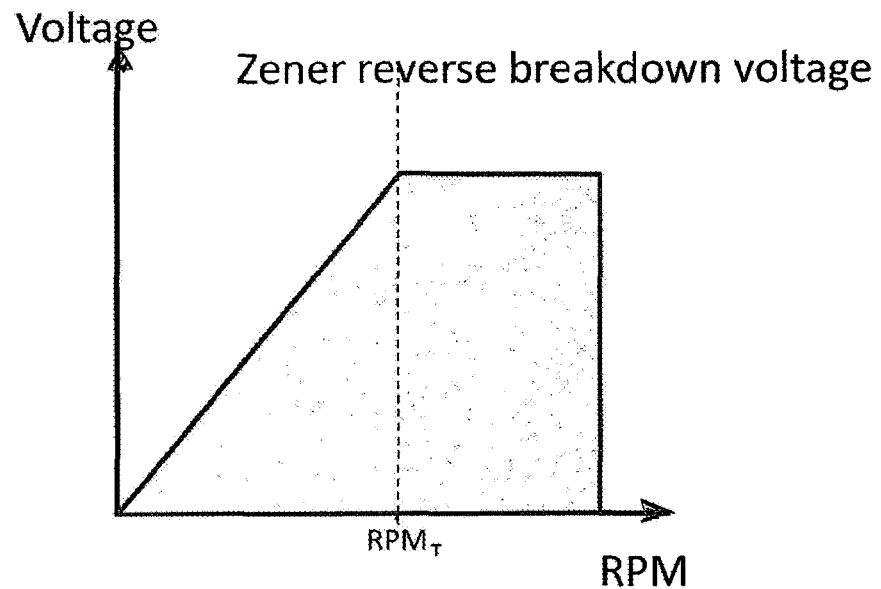
FIGS. 6A and 6B are graphs showing the evolution of the outputted voltage and power as a function of the number of revolutions per minute (RPM) of the rotor.
Figure 6B:
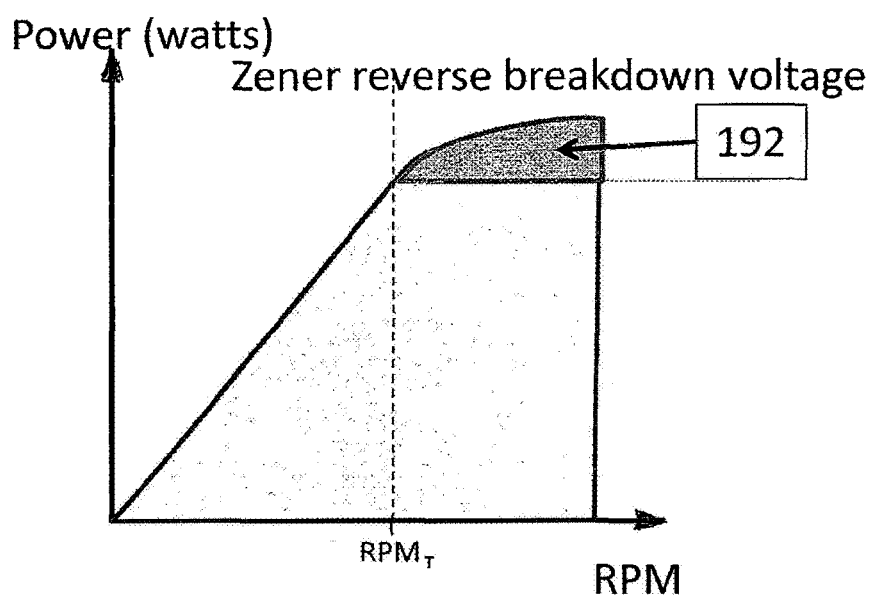

Referring to FIGS. 6A and 6B, the relation between the outputted voltage (FIG. 6A) and power (FIG. 6B) of the main coil 144 as a function of the number of Revolution Per Minute (RPM) of the rotor is illustrated.

Referring to FIG. 6A, up to a certain number of RPM, the RPM threshold ($RPM_T$), the voltage generally linearly increases with the number of RPM. However, once the rotor 110 reaches a higher number of RPM than $RPM_T$, the control circuit 166 activates and thereby starts diverting a portion of the outputted voltage.

Referring now to FIG. 6B, similarly to the graph of FIG. 6A, the power outputted by the main coil 144 increases linearly with the number of RPM up to $RPM_T$. However, in the case of outputted power, the value continue to rise, though not linearly, with the number of RPM even when the number of RPM is above $RPM_T$. This extra power 192 is due to the widening of the voltage waveform as the number of RPM increases (see FIG. 5).

Figure 7:
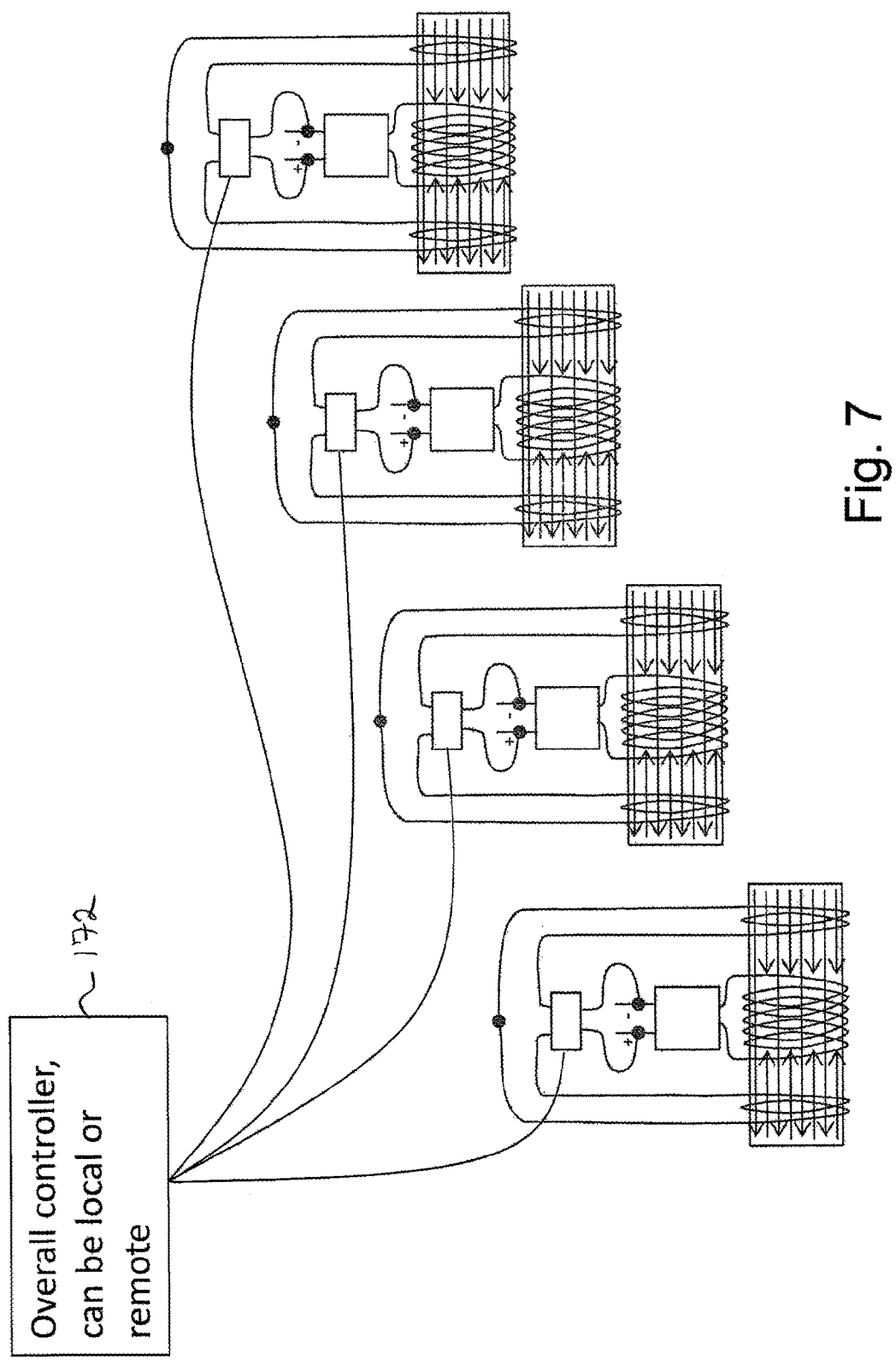
FIG. 7 is a schematic view of another embodiment of the magnetic voltage limiting system in accordance with the principles of the present invention.

In the present embodiment, each coil assembly 140 comprises a limiting system 160 having its own control circuit 166. However, in other embodiments, the control circuitry could be centralized in a single main controller 172. FIG. 7 schematically illustrates such an embodiment wherein is illustrated a current reading portion of the main controller with the limiting circuit control component (not illustrated) allowing to open or close (actuate) the limiting circuits.

Understandably, the limiting system 160 generally slows down the rotor proportionally to the current/voltage fed in the limiting coils 162 and 164 and resistor 170 and will be dissipated in the form of heat. The control circuit 166 will distribute the power between the limiting coils 162 and 164 and the limiting resistor 170 and dissipate this power in form of heat mainly in generating the opposing magnetic fields.

Even though different configurations have been illustrated through FIG. 1, FIG. 8 and FIG. 7, other functional configurations are available such as, for instance, having rectifying circuits 146 that are shared among a number of stators 140, having a number of control circuits 166 that is less than the number of stators 140, having parallel versus series circuits or a combination to obtain an optimum mix of number of components, characteristics of the components to resist to circulating current, robustness of the system and fine control of the process.

As the skilled addressee will appreciate, the present embodiment of the magnetic voltage limiting system 160 is relatively simple and economic to manufacture, having the advantages of requiring only a few widely available and cheap components.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A generator comprising:
 a ring-shaped rotor assembly connectively coupled with a rotating component such that the rotor assembly rotates around an axis of rotation with a rotation speed depending of rotation speed of the rotating component, the rotor assembly comprising a plurality of magnets;
 a ring-shaped stator assembly magnetically coupled with the rotor assembly, the stator assembly comprising a plurality of coil assemblies, one or more coil assemblies including:
  a magnetically transmissive core component;
  a generating coil generating a current in response to a magnetic field induced in the core component as the rotor assembly rotates with respect to the stator assembly, the generating coil being winded around the core component;
  a first field limiting coil and a second field limiting coil electrically coupled with the generating coil, the first field limiting field coil and the second field limiting coil being disposed on each side of the generating coil and winded around the core component; and
  a field limiting control component diverting a portion of the current generated by the generating coil to the field limiting coils.

2. The generator of claim 1, wherein the field limiting control component starts diverting current when the generated current reaches a threshold.

3. The generator of claim 1, wherein the field limiting control component comprises:
 current reading component reading the current generated by at least one generating coil; and
 diverting current control component diverting a portion of the generated current toward the field limiting coils.

4. The generator of claim 1, wherein the field limiting coils are winded around the core component in opposed direction, thereby generating magnetic fields of opposed directions as current circulates through the field limiting coils.

5. The generator of claim 1, wherein one of the field limiting coils is disposed closer to the rotor as the other field limiting coil, the closer field limiting coil and the magnet inducing a magnetic field in the core component having magnetic fields of opposed directions associated therewith, thereby generating a force against rotation of the rotor assembly.

6. The generator of claim 1, wherein the portion of the current diverted consists in over-threshold portion of the generated current.

7. The generator of claim 1, wherein the generator generates more current as the speed of the rotating component increases up to a speed over which the generator enters into an auto-regulated mode during which the current outputted by the generator is substantially stable.

8. The generator of claim 1, wherein a single one of the field limiting control component is electrically coupled to the one or more coil assemblies.

9. The generator of claim 1, wherein the filed limiting control component comprises at least one of:
 A diode;
 A Zener diode; and
 A resistor.

10. The generator of claim 1, further comprising a rectifying circuit transforming alternative current generated by the generating coil into direct current.

11. A field limiting system comprising:
 a) a first field limiting coil and a second field limiting coil electrically coupled with a generating coil winded around a magnetically transmissive core component, the generating coil outputting generated current according to magnetic field induced in the core component by a rotor assembly, the first field limiting field coil and the second field limiting coil being disposed on each side of the generating coil and winded around the core component; and
 b) a field limiting control component diverting a portion of the current outputted by the generating coil to the field limiting coils.

12. A field limiting system comprising:
 a) a plurality of generator-integrated field limiting assemblies each comprising a first field limiting coil and a second field limiting coil actuably electrically coupled with a generating coil winded around a magnetically transmissive core component, the generating coil outputting generated current according to magnetic field induced in the core component by a rotor assembly, the first field limiting field coil and the second field limiting coil being disposed on each side of the generating coil and winded around the core component; and
 b) b) a field limiting control component distinct and electrically coupled with the field limiting assemblies and the generating coil:
  a current reading component reading the current generated by at least one generating coil; and
  diverting current control component actuating the field limiting assemblies to divert a portion of the generated current toward the field limiting coils.

13. A generator comprising a rotor assembly and a stator assembly, the rotor assembly comprising a plurality of magnets, the stator comprises a plurality of coil assemblies, each of the coil assemblies comprising a field limiting system as described in claim 12.

* * * * *